(12) United States Patent
Liao et al.

(10) Patent No.: US 10,945,078 B2
(45) Date of Patent: Mar. 9, 2021

(54) FIBER LASER MICROPHONES WITH GRAPHENE DIAPHRAGMS

(71) Applicant: UCHICAGO ARGONNE, LLC, Chicago, IL (US)

(72) Inventors: Shaolin Liao, Bolingbrook, IL (US); Hual-Te Chien, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 16/105,295

(22) Filed: Aug. 20, 2018

(65) Prior Publication Data

US 2020/0059738 A1   Feb. 20, 2020

(51) Int. Cl.
| | | |
|---|---|---|
| *H01S 3/067* | (2006.01) | |
| *H04R 23/00* | (2006.01) | |
| *H01S 3/00* | (2006.01) | |

(52) U.S. Cl.
CPC ......... *H04R 23/008* (2013.01); *H01S 3/0007* (2013.01); *H01S 3/0675* (2013.01); *H04R 2307/023* (2013.01)

(58) Field of Classification Search
CPC .... G01D 5/266; G01D 5/353; G01D 5/35303; G01D 5/35306; G01D 5/35309; G01D 5/35312; G01D 5/35316; G01D 5/35319
See application file for complete search history.

(56) References Cited

U.S. PATENT DOCUMENTS

| | | | |
|---|---|---|---|
| 5,262,884 A | 11/1993 | Buchholz | |
| 2005/0063430 A1* | 3/2005 | Doucet | H01S 3/0675 372/23 |
| 2005/0195403 A1* | 9/2005 | Xu | G01D 5/266 356/480 |
| 2012/0116255 A1* | 5/2012 | Wang | G02B 6/30 600/587 |

(Continued)

FOREIGN PATENT DOCUMENTS

CN   101783997 A   7/2010

OTHER PUBLICATIONS

Ma et al., "Fiber-optic ferrule-top nanomechanical resonator with multilayer graphene film", Aug. 15, 2014, Optics Letters, vol. 39 No. 16, p. 4769-4772 (Year: 2014).*

(Continued)

*Primary Examiner* — Jonathan M Hansen
(74) *Attorney, Agent, or Firm* — Foley & Lardner LLP

(57) ABSTRACT

An acoustic sensor comprises a sensing head comprising an optical fiber having a tip. A graphene diaphragm is disposed on the tip and is configured to vibrate in response to an acoustic signal. A fiber laser is optically coupled to the sensing head. The fiber laser comprises a first set of fiber Bragg gratings and a second set of fiber Bragg gratings. A gap is present between the first set and the second set of fiber Bragg gratings. The fiber laser is configured to generate a sensing optical signal having a first intensity in response to an excitation optical signal, the sensing optical signal (Continued)

impinging on the graphene diaphragm such that a feedback optical signal is reflected from the graphene diaphragm towards the fiber laser and has and has a second intensity modulated by the vibration of the graphene diaphragm that corresponds to the acoustic signal.

19 Claims, 12 Drawing Sheets

(56) References Cited

U.S. PATENT DOCUMENTS

| | | | |
|---|---|---|---|
| 2014/0054451 A1* | 2/2014 | Abedin | G01L 11/025 250/227.14 |
| 2014/0060726 A1 | 3/2014 | Stehle et al. | |
| 2016/0295338 A1* | 10/2016 | Lettow | H04R 31/003 |
| 2018/0132042 A1* | 5/2018 | Fishman | H04R 3/005 |

OTHER PUBLICATIONS

Ma et al., "Fiber-Optic Fabry-Perot acoustic sensor with multilayer graphene diaphragm", May 15, 2013, Photonics Technology Letters, vol. 25, No. 10, p. 932-935 (Year: 2013).*
Geim & Novoselov, "The rise of grapheme," Nature Materials 6, pp. 183-191 (2007).
Geim, "Graphene: Status and Prospects," Science 324(5934), pp. 1530-1534 (2009).
Hadeler, et al., "Polarimetric distributed feedback fiber laser sensor for simultaneous strain and temperature measurements," Applied Optics 38(10), pp. 1953-1958 (1999).
Huang, "Coupled-mode theory for optical waveguides: an overview," Journal of the Optical Society of America A 11(3), pp. 963-983 (1994).
Jo, et al., "Large-scale patterned multi-layer graphene films as transparent conducting electrodes for GaN light-emitting diodes," Nanotechnology 21, 175201, 6 pages (2010).

Kim, et al., "Distributed feedback laser diode integrated with distributed Bragg reflector for continuous-wave terahertz generation," Optics Express 20(16), pp. 17496-17502 (2012).
Koyama, et al., "1.5-1.6 pm GaInAsP/InP dynamic-single-mode (DSM) lasers with distributed Bragg reflector," IEEE Journal of Quantum Electronics QE-19(6), pp. 1042-1051 (1983).
Lai, et al., "Distributed Bragg reflector fiber laser fabricated by femtosecond laser inscription," Optics Letters 31(11), pp. 1672-1674 (2006).
Ma, et al., "Fiber-Optic Fabry-Perot Acoustic Sensor With Multilayer Graphene Diaphragm," IEEE Photonics Technology Letters 25(10), pp. 932-935 (2013).
Pradhan, et al., "Dual-Wavelength DBR Fiber Laser," IEEE Photonics Technology Letters 18(16), pp. 1741-1743 (2006).
Sanchez Guerrero, et al., "Remote ultrasensitive laser microphone," Dimensional Optical Metrology and Inspection for Practical Applications, 81330Y (2011).
Smelser, et al., "Generation of pure two-beam interference grating structures in an optical fiber with a femtosecond infrared source and a phase mask," Optics Letters 29(15), pp. 1730-1732 (2004).
Wu, et al., "A Highly Sensitive Fiber-Optic Microphone Based on Graphene Oxide Membrane," Journal of Lightwave Technology 35(19), pp. 4344-4349 (2017).
Yelen, et al., "Experimentally Verified Modeling of Erbium-Ytterbium Co-Doped DFB Fiber Lasers," Journal of Lightwave Technology 23(3), pp. 1380-1392 (2005).
Yu, et al., "Highly sensitive fiber-optic Fabry-Perot geophone with graphene-coated PMMA membrane," 2017 25th Optical Fiber Sensors Conference (2017).
Zhang, et al., "Multi-layer Graphene Diaphragm-based Fabry-Perot Interferometer for Acoustic Detection with Long Term Stability," The 6th Asia Pacific Optical Sensors Conference, 6 pages (2016).
Zhang, et al., "Ultra-short distributed Bragg reflector fiber laser for sensing applications," Optics Express 17(12), pp. 10050-10055 (2009).

* cited by examiner

FIBER LASER MICROPHONES WITH GRAPHENE DIAPHRAGMS

GOVERNMENT SUPPORT CLAUSE

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to the field of acoustic/ultrasound sensors.

BACKGROUND

Miniature ultra-sensitive broadband acoustics/ultrasound microphones that can detect acoustic signals over large distances (kilometers) are important for many critical applications such as geophones for seismic monitoring, vibration sensing, marine vehicles detection, remote monitoring of terrorist events or disaster zones (e.g., areas struck by earthquakes, artillery or radiation), etc. Remote monitoring of acoustic signals at locations situated kilometers away from the sensing location may provide detailed information on the status of individuals or other assets present in such areas, without endangering a monitoring team. Conventional microphones used for acoustic sensing can be classified into two categories: 1) electrical signal based microphones which measure acoustic signals via induced resistance or capacitance change due to the acoustic signal; and 2) passive optics signal based microphones with external probing electronics. Electrical microphones are most commonly used and include those found in consumer electronics. Electrical microphones can be miniaturized but are less sensitive to high frequency acoustic signals, and therefore cannot be used for remote monitoring over large distances. On the other hand, the passive optics microphones generally use complicated interrogating instruments such as external laser source, external amplifiers and interferometers or spectrometers which makes them bulky.

SUMMARY

Embodiments described herein relate generally to opto-acoustic sensors, and in particular to an acoustic sensor comprising a graphene diaphragm positioned on an optical fiber tip, and having a miniature fiber laser coupled thereto. The fiber laser works at the telecommunication C-band (1,530-1,565 nm) and may be pumped by a 980-nm pump laser to generate a sensing laser which impinges on the graphene diaphragm. A change in intensity of the sensing laser modulated by the reflecting wave from the graphene diaphragm vibrating displacement corresponds to the acoustic signal.

In some embodiments, an acoustic sensor comprises a sensing head. The sensing head comprises an optical fiber having a tip. A graphene diaphragm is disposed on the tip and is configured to vibrate in response to an acoustic signal. A fiber laser is optically coupled to the sensing head and comprises a first set of fiber Bragg gratings and a second set of fiber Bragg gratings such that a gap is present between the first set and the second set of fiber Bragg gratings. The fiber laser is configured to generate a sensing optical signal having a first intensity in response to an excitation optical signal. The sensing optical signal impinges on the graphene diaphragm such that a feedback optical signal is reflected from the graphene diaphragm towards the fiber laser. The feedback optical signal has a second intensity due to modulation of the sensing optical signal by the vibration of the graphene diaphragm that corresponds to the acoustic signal.

In some embodiments, an acoustic sensing assembly comprises a sensing head. The sensing head comprises an optical fiber having a tip. A graphene diaphragm is disposed on the tip and is configured to vibrate in response to an acoustic signal. A fiber laser is optically coupled to the sensing head. The fiber laser comprises a first set of fiber Bragg gratings and a second set of fiber Bragg gratings such that a gap is present between the first set and the second set of fiber Bragg gratings. The fiber laser is configured to generate a sensing optical signal having a first intensity in response to an excitation optical signal. The sensing optical signal impinges on the graphene diaphragm such that a feedback optical signal is reflected from the graphene diaphragm towards the fiber laser. The feedback optical signal has a second intensity due to modulation of the sensing optical signal by the vibration of the graphene diaphragm that corresponds to the acoustic signal. A fiber optic communication cable having a length is coupled to a second end of the fiber laser opposite the first end. The acoustic sensing assembly also comprises a signal generator configured to generate the excitation optical signal, and an intensity detector configured to detect the response optical signal and determine the acoustic signal therefrom.

In some embodiments, a method comprises transmitting an excitation optical signal to a fiber laser of an acoustic transducer. The acoustic transducer comprises a sensing head that consists of an optical fiber having a tip, and a graphene diaphragm disposed on the tip. The graphene diaphragm is configured to vibrate in response to an acoustic signal. The fiber laser is optically coupled to the sensing head and comprises a first set of fiber Bragg gratings and a second set of fiber Bragg gratings having a gap there between. The fiber laser is configured to generate a sensing optical signal having a first intensity in response to an excitation optical signal. A feedback optical signal reflected from the graphene diaphragm, and having a second intensity due to modulation of the sensing optical signal by the vibration of the graphene diaphragm that corresponds to the acoustic signal, is detected. Optical parameters of the feedback optical signal are determined, and acoustic parameters of the optical signal are determined from the optical parameters.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
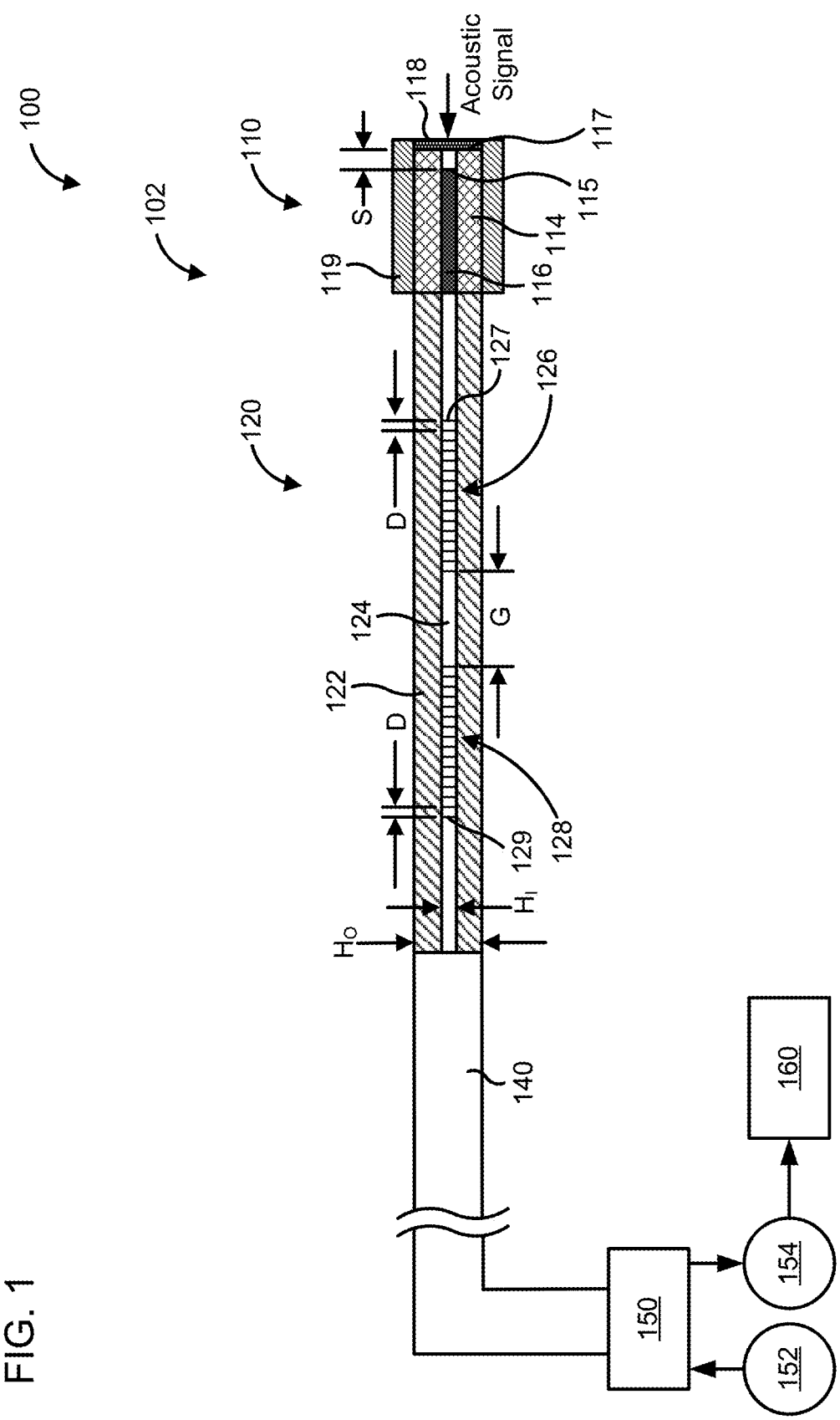
FIG. 1 is a schematic illustration of an acoustic sensing assembly including an acoustic sensor, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to opto-acoustic sensors, and in particular to an acoustic sensor comprising a graphene diaphragm positioned on an optical fiber tip, and having a miniature fiber laser coupled thereto. The fiber laser works at the telecommunication C-band (1,530-1,565 nm) and may be pumped by a 980-nm pump laser to generate a sensing laser which impinges on the graphene diaphragm. A change in intensity of the sensing laser modulated by the reflecting wave from the graphene diaphragm vibrating displacement corresponds to the acoustic signal.

Conventional microphones used for acoustic sensing can be classified into two categories: 1) electrical signal based microphones which measure acoustic signals via induced resistance or capacitance change due to the acoustic signal; and 2) passive optics signal based microphones with external probing electronics. Electrical microphones are most commonly used and include those found in consumer electronics. Electrical microphones can be miniaturized but are less sensitive to high frequency acoustic signals, and therefore cannot be used for remote monitoring over large distances. On the other hand, the passive optics microphones generally use complicated interrogating instruments such as external laser source, amplifiers and interferometers or spectrometers which makes them bulky.

Embodiments of the acoustic sensors described herein provide several benefits including, for example: (1) providing high sensitivity up to 10 $\mu Pa/Hz^{1/2}$ via an acoustic transducer including a single or multi-layer graphene diaphragm; (2) performing acoustic sensing using a pump diode laser and a detector thus being less bulky than traditional opto-acoustic sensors; (3) allows sensing over long distances in a range of 1-10 kms away from the sensing site; and (4) facilitating multiplexing into arrays of opto-acoustic sensors. The acoustic sensors described herein can be easily adapted to be used in various applications, for example, industrial applications such as machine monitoring, geophones, hydrophones or photoacoustic environmental sensing, biomedical applications such as patient monitoring, laparoscopic surgical applications, heart beat or respirations monitoring, and/or national security applications such as border security, surveillance, disaster zone monitoring, etc.

FIG. 1 is a schematic illustration of an acoustic sensing assembly 100, according to an embodiment. The acoustic sensing assembly 100 can be used for detecting acoustic signals over long distances, for example, over distances in the range of 1 km to 10 km or even more. The acoustic sensing assembly 100 comprises an acoustic sensor 102 comprising a sensing head 110 and a fiber laser 120, a fiber optic communication cable 140, a signal generator 152 and an intensity detector 154, and may also include a multiplexer 150 and a computing device 160.

The sensing head 110 includes an optical fiber 114 having a tip 117. The optical fiber 114 may include a short piece of optical fiber which may be inserted in a ferrule 119 for protection against mechanical damage as well as facilitating handling of the sensing head 110 by a user. The optical fiber 114 may have a diameter in a range of 125-250 microns (e.g., 125, 150, 175, 200, 225 or 250 microns inclusive of all ranges and value there between). The optical fiber 114 defines an optical path 116 therethrough configured to allow an optical signal (e.g., a laser) to be communicated therethrough to the tip 117 thereof.

A graphene diaphragm 118 is disposed on the tip 117 and configured to vibrate in response to an acoustic signal, for example, an acoustic signal having a specific frequency and bandwidth. In some embodiments, a portion of the graphene diaphragm 118 may also be coupled to the ferrule 119 positioned around the fiber optic cable 114. The graphene diaphragm 118 may include a single layer or multi-layer graphene sheet. In particular embodiments, the graphene diaphragm 118 has a thickness in a range of 0.15-150 nm (e.g., 0.15, 1.0, 10, 20, 30, 40, 50, 60, 70, 80, 90, 100, 110, 120, 130, 140 or 150 nm inclusive of all ranges and values there between). In particular embodiments, the graphene diaphragm 118 has a thickness of about 105 nm. In some embodiments, the graphene diaphragm 118 may be coupled to the tip 117 via Van der Waals forces, which depend on optical fiber tip materials, its morphology and surface chemical bonding, for example, Van der Waals force between the a silica optical fiber tip 114 and the graphene diaphragm 118. In some embodiments, the Van der Waals forces may range from 0.01 J/m² to 1 J/m². In other embodiments, the graphene diaphragm may be coupled to the tip via adhesives, an interfacial layer (e.g., a silane), covalent coupling or any other suitable coupling method.

In some embodiments, at least a portion of the graphene diaphragm 118 is spaced apart from an end face 115 of the optical path 116 defined by the optical fiber 114 by a distance S. For example, the end face 115 of the optical path 116 may be spaced apart from the tip 117 by the distance S. In other embodiments, the end face 115 may be flush with the tip 117 and the graphene diaphragm 118 may be positioned on the ferrule 119 such that the graphene diaphragm 118 is spaced apart from the tip 117 by the distance S. In some embodiments, the distance S may be in a range of 0.1-2.0 mm (e.g., 0.1, 0.3, 0.5, 0.7, 0.9, 1.0, 1.2, 1.4, 1.6, 1.8 or 2.0 mm inclusive of all ranges and values there between). The distance S may provide a space for the graphene diaphragm 118 to vibrate in response to an acoustic signal (e.g., an audible or ultrasound acoustic signal), the vibration of the graphene diaphragm 118 corresponding to an amplitude and wavelength of the acoustic signal. The small thickness of the graphene diaphragm 118 increases the sensitivity of the graphene diaphragm 118 to acoustic signals. In some embodiments, the graphene diaphragm 118 may be sensitive to acoustic signals having frequencies in a range of 1 Hz to 10 kHz such that the acoustic sensor 102 may have a sensitivity up to 10 $\mu Pa/Hz^{1/2}$.

The fiber laser 120 is optically coupled to the sensing head 110 (e.g., via an optical coupler) at a first end thereof. The fiber laser 120 may comprise a fiber body 122 surrounding a fiber core 124 (e.g., cladding) of the fiber laser 120. In some embodiments, a protective sheath (not shown) may be disposed around the fiber body 122. The protective sheath may include a plastic or polymer sheath configured to provide mechanical protection to the fiber laser 120 as well as limit loss of a sensing optical signal generated by the fiber laser 120 or a reflected optical signal reflected from the graphene diaphragm 118. In some embodiments, the protective sheath may also include a water barrier coating to protect water ingress into the fiber laser 120. In some embodiments, a reflective coating having a diameter of about 250 μm may be coated on the about 125-μm fiber core 124 (e.g., disposed between the about 125-μm fiber core 124 and the fiber body 122) so as to reflect optical signals back into the about 125-μm fiber core 124, thereby preventing optical signal loss.

The fiber laser 120 comprises a first set 126 of fiber Bragg gratings 127 and a second set 128 of fiber Bragg gratings 129 separated by a gap G which defines a laser cavity. In some embodiments, the fiber laser 120 may be a Distributed Bragg Reflector (DBR) laser. In such embodiments, the gap G between the first set 126 and the second set 128 of fiber Bragg gratings 127 and 129 is in a range of <1 mm to 10 mm (e.g., 1, 2, 3, 4, 5, 6, 7, 8, 9 or 10 mm inclusive of all ranges and values there between).

In other embodiments, the fiber laser 120 may comprise a Distributed Feedback Bragg (DFB) laser. In such embodiments, the gap G may be a quarter wavelength $\lambda_{fiber}/4$ to about 265 nm. Moreover, the spacing D may be from <1 mm to 10 mm (e.g., 1, 2, 3, 4, 5, 6, 7, 8, 9 or 10 mm inclusive of all ranges and values there between) to form the DFB fiber laser. The fiber core body 122 may have an outer diameter $H_O$ of about 125 microns and the fiber core 124 may have a diameter $H_I$ of about 5 microns.

The fiber laser 120 is configured to generate the sensing optical signal having a first intensity in response to an excitation optical signal received from the signal generator 152, for example, a 980 nm pump laser. The sensing optical signal may have a wavelength in the telecommunication C-band, for example, in a range from 1,530 nm to 1,565 nm. The sensing optical signal impinges on the graphene diaphragm 118 such that a feedback optical signal is reflected from the graphene diaphragm 118 towards the fiber laser 120. The feedback optical signal has a second intensity due to modulation of the sensing optical signal by the vibration of the graphene diaphragm 118 that corresponds to the acoustic signal. In other words, in the vibration of the graphene diaphragm 118 modulates the first intensity of the fiber laser 120 to yield the feedback optical signal having the second intensity that corresponds to the acoustic signal.

Expanding further, the acoustic signal incident on the graphene diaphragm 118 causes the graphene diaphragm 118 to vibrate. The sensing optical signal impinges on the graphene diaphragm 118 and is reflected therefrom as the feedback optical signal. The vibration of the graphene diaphragm 118 changes the intensity and phase of the feedback optical signal, with the change being proportional to the acoustic signal (e.g., a frequency and/or amplitude of the acoustic signal) and the feedback optical signal modulates the first intensity of the fiber laser that can be used to determine a value of the acoustic signal therefrom.

The signal generator 152 and the detector 154 are optically coupled to the fiber laser 120 by the fiber optic communication cable 140, for example, via the multiplexer 150. The fiber optic communication cable 140 has a length and is coupled to a second end of the fiber laser 120 (e.g., via an optical coupler). The length of the fiber optic communication cable 140 may be in a range of 1 kms to 10 kms or even longer. The feedback optical signal having a wavelength of at the telecommunication C-band (1,530-1565 nm) may have sufficient power after traveling through the fiber optic communication cable 140 to enable detection via the detector 154 located kms away from the sensing site.

The signal generator 152 may include a pump laser configured to generate the excitation optical signal. In some embodiments, the excitation optical signal may have a wavelength of about 980 nm. In various embodiments, the multiplexer 150 may include a wavelength-division multiplexer configured to multiplex the 980 nm pump laser and the 1,550 nm sensing optical signal onto the single fiber optic communication cable, thereby allowing bidirectional optical communication of both the optical signals over the fiber optic communication cable 140 such that a separate optical fiber is not used for the sensing optical signal.

The intensity detector 154 is configured to receive the feedback optical signal, for example, via the multiplexer 150 and convert the feedback optical signal into an electrical signal (e.g., a current or a voltage). The detector 154 may include an intensity photodiode, a pyroelectric sensor or a wavelength sensor. In various embodiments, the intensity detector 154 may also include one or more filters (e.g. low pass, high pass or bandpass filters) or locked-in amplifiers configured to filter noise and increase SNR. In some embodiments, the intensity detector 154 may be configured to determine the acoustic signal from the electrical signal. In other embodiments, a computing device 160 may be coupled to the detector 154 and configured to interpret the electrical signal received from the intensity detector 154 so as to determine the acoustic signal therefrom, for example, determine an amplitude or frequency of the acoustic signal.

Figure 2:
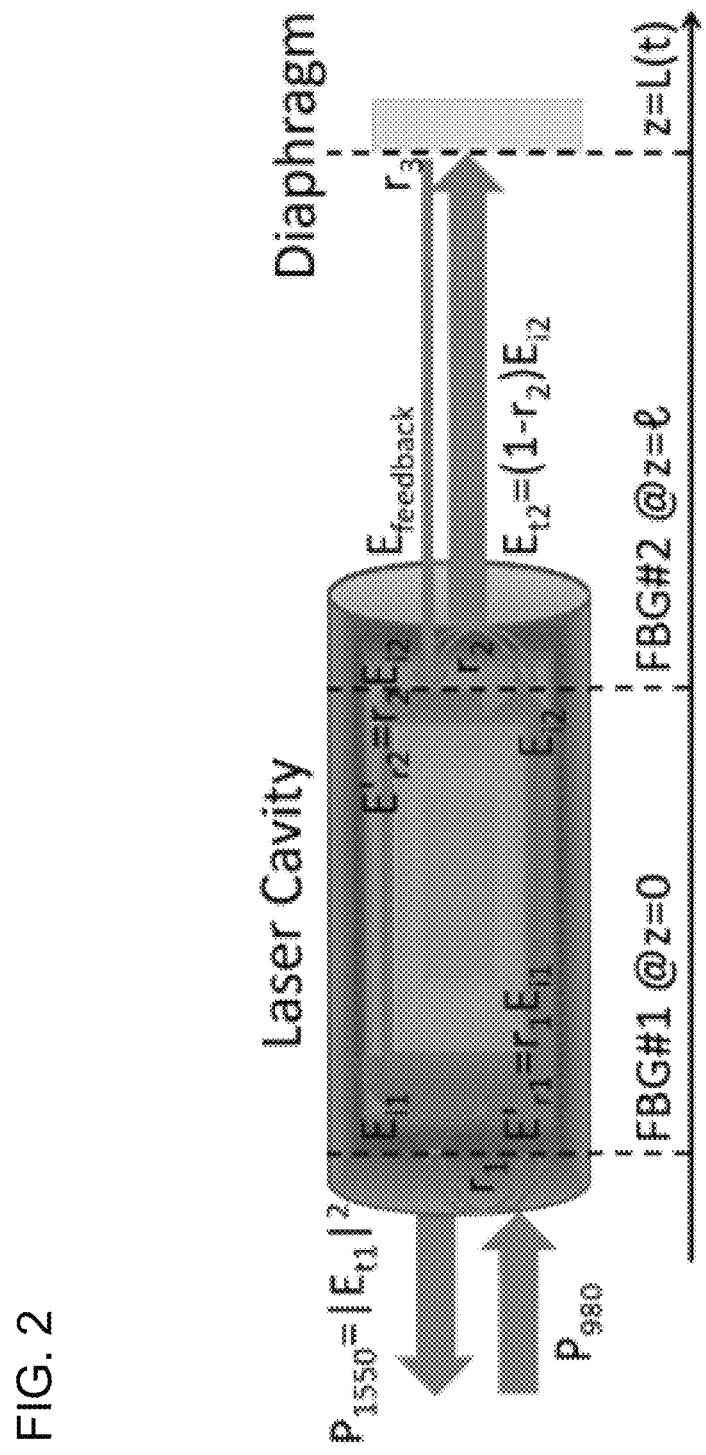
FIG. 2 is a schematic illustration illustrating the working principle of the acoustic sensor of FIG. 1.

FIG. 2 is a schematic illustration of the working principle of the fiber laser 120. The fiber laser 120 may only be a few cm long (i), with the two set 126 and 128 of Fiber Bragg Gratings (FBG #1 and FBG #2) or reflectors on both sides of the laser cavity G (e.g., exactly ¼ wavelength long for the DFB fiber laser, and arbitrary long for the DBR fiber laser). The graphene diaphragm 118 may be attached to the tip 117 with a gap of about 0.1-2.0 mm. When the acoustic signal vibrates the graphene diaphragm 118, it changes the phase of the 1,550-nm laser (i.e., the sensing optical signal $E_{t2}$) pumped by a 980-nm laser ($P_{980}$) and thus provides 1,550-nm laser feedback (i.e., the optical signal $E_{feedback}$) towards the laser cavity G. The feedback modulates the 1,550-nm laser intensity ($P_{1550}$), which can be monitored in real time to give the acoustic response.

Figure 3:
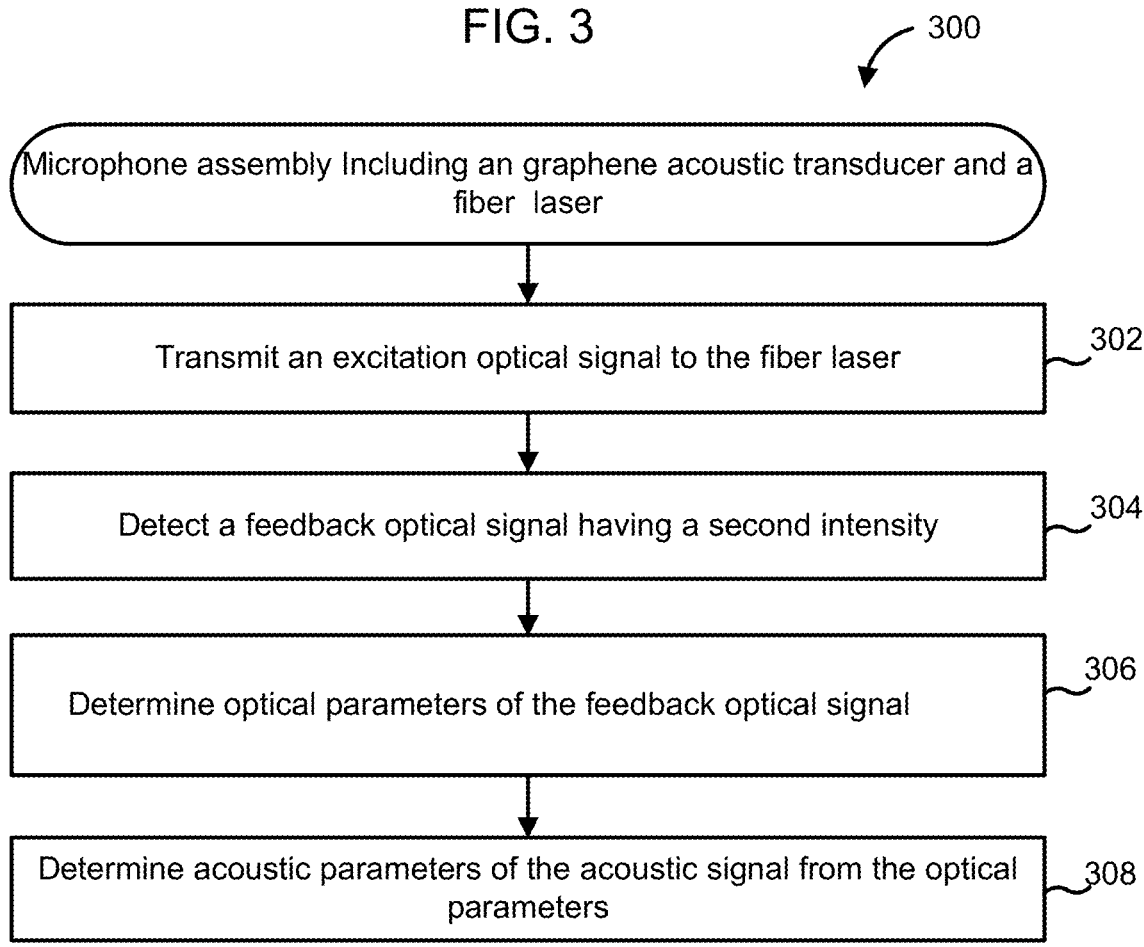
FIG. 3 is a schematic flow diagram of a method for remotely sensing of acoustic signals using an acoustic sensor, according to an embodiment.

FIG. 3 is a schematic flow diagram of a method 300 for sensing an acoustic signal, according to an embodiment. The method 300 comprises transmitting an excitation optical signal (e.g., a 980-nm pump laser) to a fiber laser of an acoustic sensor, at 302. The acoustic sensor (e.g., the acoustic sensor 102) comprises a sensing head (e.g., the sensing head 110) and a fiber laser (e.g., the fiber laser 120). The sensing head comprises an optical fiber (e.g., the fiber optic cable 114) having a tip (e.g., the tip 117), and a graphene diaphragm (e.g., the graphene diaphragm 118) disposed on the tip and configured to vibrate in response to an acoustic signal. The fiber laser is optically coupled to the sensing head. The fiber laser comprises a first set of fiber Bragg gratings (e.g., the first set 126) and a second set of fiber Bragg gratings (e.g., the second set 128) having a gap (e.g., the gap G) there between.

The fiber laser is configured to generate a sensing optical signal (e.g., a 1,550 nm wavelength laser) when pumped by an excitation optical signal (e.g., a 980 nm pump laser), for example, received from the signal generator 152 via the multiplexer 150. In some embodiments the fiber laser comprises a DBR laser. In such embodiments, the gap between the first set and the second set of fiber Bragg gratings is in a range of 0.1-2.0 mm. In other embodiments, the fiber laser comprises a DFB laser. In such embodiments, the gap between the first set and the second set of fiber Bragg gratings is $\lambda_{eff}/4$ of about 265 nm.

At 304, a feedback optical signal having a second intensity due to modulation of the sensing optical signal by the vibration of the graphene diaphragm and that corresponds to the acoustic signal is detected. For example, the sensing optical signal is reflected from the graphene diaphragm 118 as the feedback optical signal (e.g., having a wavelength of 1,550 nm). The vibration of the graphene diaphragm 118 due to the acoustic signal changes the intensity of the sensing optical signal to the feedback optical signal due to the acoustic signal. The feedback optical signal may be detected by the intensity detector 154 via the multiplexer 150.

At 306, optical parameters of the feedback optical signal (e.g., an amplitude and phase of the feedback optical signal) are determined. For example, the computing device 160 may interpret the electrical signal received from the intensity detector 154 to obtain the amplitude and phase of the feedback optical signal. At 308, acoustic parameters of the acoustic signal (e.g., a frequency and spectrogram of the acoustic signal) are obtained from the optical parameters. For example, the intensity detector 154 or the computing device 160 may determine a value of the acoustic parameter, for example, using any suitable equations, algorithms or lookup tables.

EXPERIMENTAL RESULTS

Miniature DBR/DFB fiber lasers are made of Er/Yb co-doped active fiber with two Fiber Bragg Gratings (FBG) reflectors on both sides to form a 1,550 nm laser cavity. When pumped by a 980 nm laser, it will lase when threshold pump power condition is reached.

A. The Theory of the Active FBG at Resonance

The active FBG can be analyzed through the coupled modes theory, where only two counter-propagating single modes inside the fiber are involved. Similar to the passive FBG, the active FBG can be considered as a highly frequency dependent distributed mirror reflector with reflectivity given by, $$r = |r|e^{-j\phi} = \frac{-j\kappa}{j(\Delta\beta - j\alpha_g) + \frac{\gamma_0}{\tanh(\gamma_0 L)}} \quad (1)$$

where $\alpha_0 = \sqrt{\kappa^2 - (\Delta\beta - j\alpha_g)^2}$; $\kappa$ is the mode coupling coefficient; $\alpha_g < 0$ is the amplitude gain coefficient of the active fiber, and L is the length of the FBG; also, $\Delta\beta = \beta - \beta_B$ is the propagation constant deviation from the Bragg propagation constant $\beta_B = \pi/\Lambda$ with a grating pitch of $\Lambda$. With help from Eq. (1), the effective length of the FBG reflector at resonance is then given by, $$L_{eff} = \frac{1}{2}\frac{\partial \phi}{\partial \Delta\beta} = \frac{\alpha_g L \left[\frac{\tanh(\gamma_0 L)}{\gamma_0 L} - \frac{1}{\cosh^2(\gamma_0 L)}\right] + \tanh^2(\gamma_0 L)}{2[\alpha_g \tanh^2(\gamma_0 L) + \gamma_0 \tanh(\gamma_0 L)]}$$

B. Modeling of the Off-Resonance DFB

At wavelengths other than the resonant Bragg wavelength, the DBR/DFB structure is simulated. Assuming single-mode operation of the DBR/DFB fiber laser, one-dimensional coupled modes theory applies and can be solved by the Transfer Matrix Method (TMM), with gain governed by the rate equations.

1) Coupled Modes Theory:

Starting from the Maxwell's equations, the coupled modes equations for the amplitudes of the forward wave (F) and backward wave (B) are coupled with each other, $$\frac{\partial F(z)}{\partial z} = -F(z)(-g + j\Delta\beta) + j\kappa B(z), \quad (2)$$

$$\frac{\partial B(z)}{\partial z} = -B(z)(-g + j\Delta\beta) - j\kappa F(z)$$

2) The TMM for the Coupled Modes Theory:

The coupled modes theory in Eq. (2) can be solved through the TMM, where the forward wave's amplitude (F) and backward wave's amplitude (B) of the adjacent segments i and i+1 are connected through the transfer matrix T, $$\begin{bmatrix} F^{(i+1)} \\ B^{(i+1)} \end{bmatrix} = \begin{bmatrix} T_{11}^{(i)} & T_{12}^{(i)} \\ T_{21}^{(i)} & T_{22}^{(i)} \end{bmatrix} \begin{bmatrix} F(i) \\ B(i) \end{bmatrix}. \quad (3)$$

C. Simulation of the DBR/DFB Fiber Laser

With the coupled modes theory and TMM, the lasing behaviors of the DBR/DFB fiber laser can be simulated iteratively, including lasing threshold, lasing power and lasing Centered Wavelength (CW).

1) Rate Equations for the Er/Yb Co-Doped Fiber:

Before simulating the DBR/DFB fiber laser with the coupled mode theory in Eq. (2) and TMM in Eq. (3), the gain of the Er/Yb co-doped fiber should be known. It is related to the states' populations of the Er/Yb ions, whose rate equations can be solved as follows, $$\frac{dN_1}{dt} = N_1(-W_{12} - R_{13}) + N_2(W_{12} + A_{21}) + N_3R_{31} + N_4R_{41} +$$
$$(C_{2213}N_2^2 + C_{3314}N_3^2) + (-k_{tr}N_{6,n}N_1 + k_{tr}N_3N_{5,n}) = 0$$

$$\frac{dN_2}{dt} = N_1W_{12} + N_2(-W_{21} - A_{21} - R_{23,ESA}) + N_3A_{32} - 2C_{2213}N_2^2 = 0$$

$$\frac{dN_3}{dt} = N_1(R_{13}) + N_2R_{23,ESA} + N_3(-R_{31} - A_{32} - R_{34,ESA}) + N_4R_{43} +$$
$$(C_{2213}N_2^2 - 2C_{3314}N_3^2) + (-k_{tr}N_{6,n}N_1 + k_{tr}N_{5,n}N_3) = 0$$

$$\frac{dN_4}{dt} = N_3R_{34,ESA} + N_4(-R_{41} - R_{43}) + C_{3314}N_3^2$$

$$\frac{dN_{5,n}}{dt} = N_{5,n}(-R_{56}) + N_{6,n}(R_{65} + A_6) + (k_{tr}N_{6,n}N_1 - k_{tr}N_3N_{5,n}) = 0$$

$$\frac{dN_{6,n}}{dt} = N_{5,n}R_{56} + N_{6,n}(-R_{65} - A_6) + (-k_{tr}N_{6,n}N_1 + k_{tr}N_3N_{5,n}) = 0$$

$$\frac{dN_{5,q}}{dt} = N_{5,q}(-R_{56}) + N_{6,q}(R_{65} + A_6) = 0$$

$$\frac{dN_{6,q}}{dt} = N_{5,q}R_{56} + N_{6,q}(-R_{65} - A_6) = 0$$

$$N_{n,Yb} = N_{5,n} + N_{6,n}$$

$$N_{q,Yb} = N_{5,q} + N_{6,q}$$

$$N_{Yb} = N_{5,n} + N_{5,q} + N_{6,n} + N_{6,q}$$

$$N_{Er} = N_1 + N_2 + N_3 + N_4$$

with $R_{ESA}$ denoting the two photons excited state absorption rate; $N_n = N_q$ denoting normal/quenched ions respectively; and other parameters given below, $$W_{12} = W_{21} = \frac{I_s}{\hbar\omega_s}\sigma_{a,s}^{Er};$$

$$W_{13} = W_{31} = \frac{I_p}{\hbar\omega_p}\sigma_{a,p}^{Er}$$

$$A_{21} = \frac{1}{\tau_2};$$

$$A_{32} = \frac{1}{\tau_3}$$

$$R_{56} = R_{65} = \frac{I_p}{\hbar\omega_p}\sigma_{a,s}^{Yb};$$

$$A_{6,n} = \frac{1}{\tau_{6,n}}; A_{6,n} = \frac{1}{\tau_{6,q}}.$$

where $\omega_s = \omega_p$ and $I_s = I_p$ are the signal/pump angular frequencies and signal/pump intensities respectively; $\sigma_{a,s}/\sigma_{a,p}$ is the signal/pump absorption cross section; and $\tau_n/\tau_q$ is the spontaneous decay time constant for the normal/quenched Ytterbium ion.

To obtain self-consistent solution, both coupled modes equations given in Eq. (2) and the rate equations given in Eq. (4) have to be solved simultaneously. This was achieved through solving both set of equations iteratively.

2) Numerical Simulation: With the coupled modes theory given in Eq. (2) and rate equations given in Eq. (4), the DBR/DFB fiber laser can be simulated through TMM according to Eq. (3) for the parameters pair $(\lambda;B(0))$, i.e., the lasing wavelength $\lambda$ and the 1,550 nm backward lasing amplitude on the left side $B(0)$. Numerically, the lasing point is found when both incidence waves on the left and right sides disappear, i.e., $F(0)=B(L)=0$, in the two-dimensional parameters pair space, i.e., $\{(\lambda;B(0))\}$. The numerical recipe is given as follow:

i) Given a set of two-dimensional parameters pairs, $\{\lambda^{(i)}, B(0)^{(i)}\}$, BOA$\}=1; 2; 3 \ldots$;

ii) Step into each parameters pair $(\lambda^{(i)}, B(0)^{(i)})$;

iii) Set the 980-nm pump power, the 1,550 nm laser power and the initial gain: $P_{980}(z)=0$, $P_{1,550}(z)=0$ and $g(z|P_{980}(z)=0, P_{1,550}(z)=0)=0$;

iv) With the updated parameters $P_{980}(z)$, $P_{1,550}(z)$ and g(z), assuming uniform dielectric profile for 980 nm wavelength, propagate the 980 nm pump wave through the fiber laser and obtain the 980 nm pump power $P_{980}(z)$;

v) With the calculated 980 nm pump power $P_{980}(z)$, solve for the gain $g(z|P_{980}(z)=0, P_{1,550}(z)=0)$ according to Eq. (4);

vi) With the obtained gain $g(z|P_{980}(z)=0, P_{1,550}(z)=0)$, $F(0)=0$ and the parameters pair $(\lambda^{(i)}, B(0)^{(i)})$, propagate the 1,550 nm wave through the fiber laser and obtain its forward/backward waves pair solution $(F(z)^{(i)};B(z)^{(i)})$ and its power $P_{1,550}(z)$;

vii) With the calculated 1,550 nm laser power $P_{1,550}(z)$, update the gain $g(z|P_{980}(z), P_{1,550}(z))$ according to Eq. (4);

viii) Repeat steps iv)-vii) until the solutions of $P_{980}(z)$, $P_{1,550}(z)$, and $g(z|P_{980}(z), P_{1,550}(z))$ converge to stable values;

ix) Step into the next parameter pair $(\lambda^{(i+1)}, B(0)^{(i\pm1)})$, and repeat steps iii)-viii);

x) Obtain the solution of the parameters pair $(\lambda, B(0))$, when $B(L)=0$ is satisfied.

Figure 4:
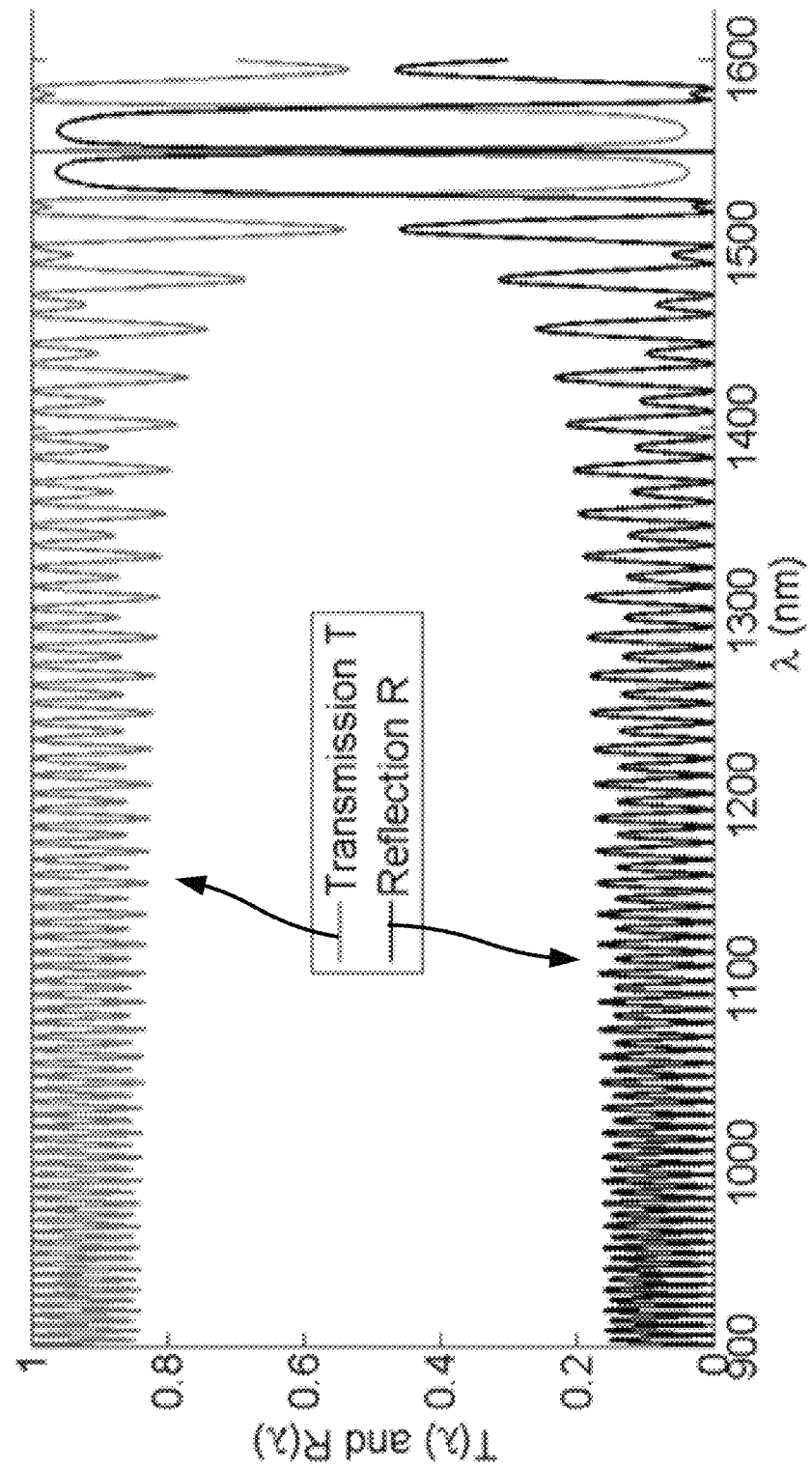
FIG. 4 are simulated transmission and reflection spectra of a distributed feedback Bragg (DFB) laser having a centered wavelength of 1547.37.
Figure 5:
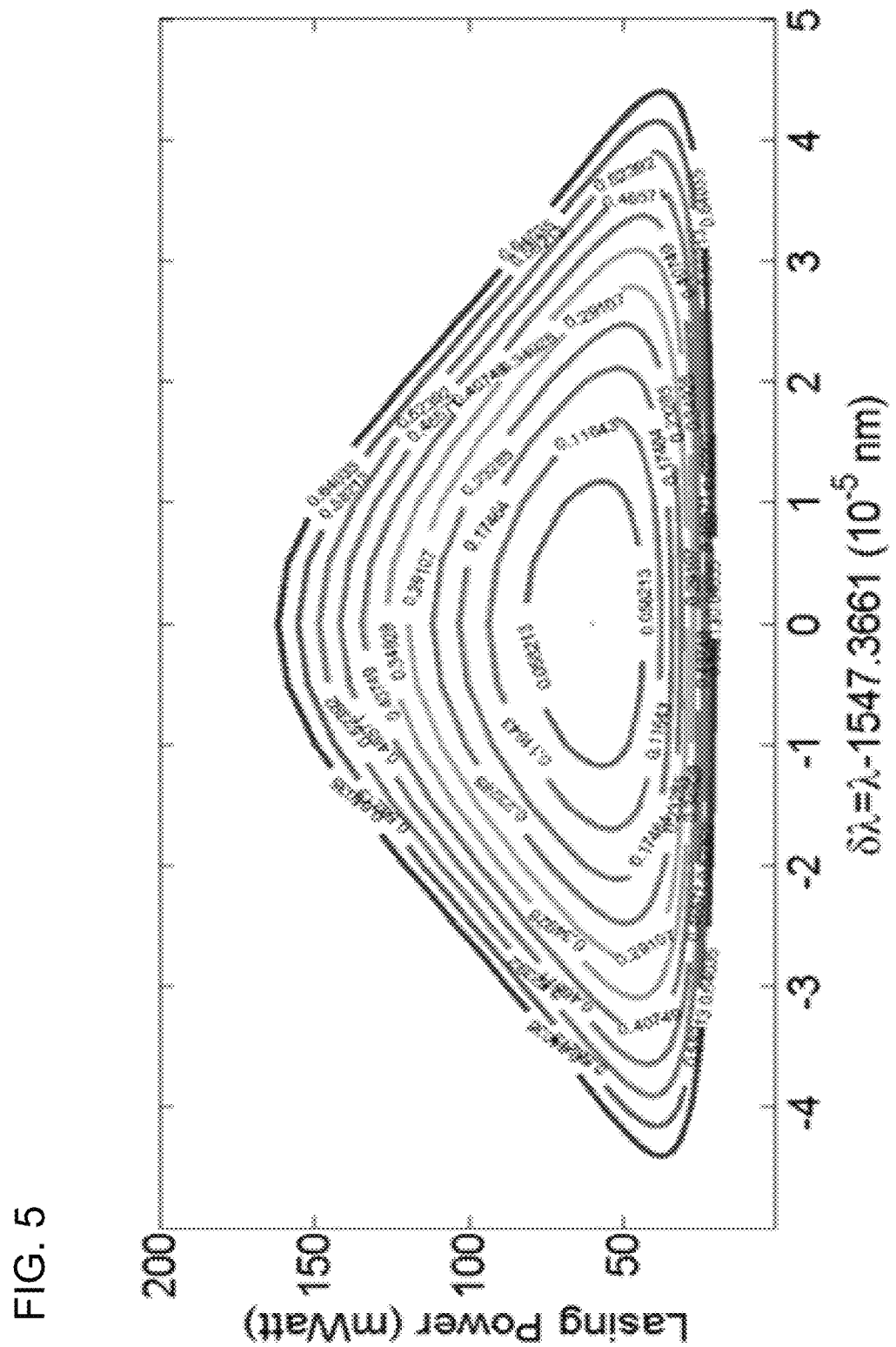
FIG. 5 is a plot of lasing point of the simulated DFB laser for a 500 mWatt 980 nm pump power.

3) DBR/DFB Fiber Lasers Design: A DFB fiber laser is designed using the numerical simulation described above. FIG. 4 shows the design of the DFB fiber laser with a CW of 1,547.37 nm, corresponding to a FBG grating pitch of $\Lambda=532.88$ nm for a core dielectric constant of $\varepsilon=1.45$. Also, it can be seen from FIG. 5 that the 1,550 nm lasing power is about 60 mWatt for a 500 mWatt 980 nm pump power, giving a lasing efficiency of about 12%.

D. Laboratory Tests of the DFB Fiber Laser

Figure 6:
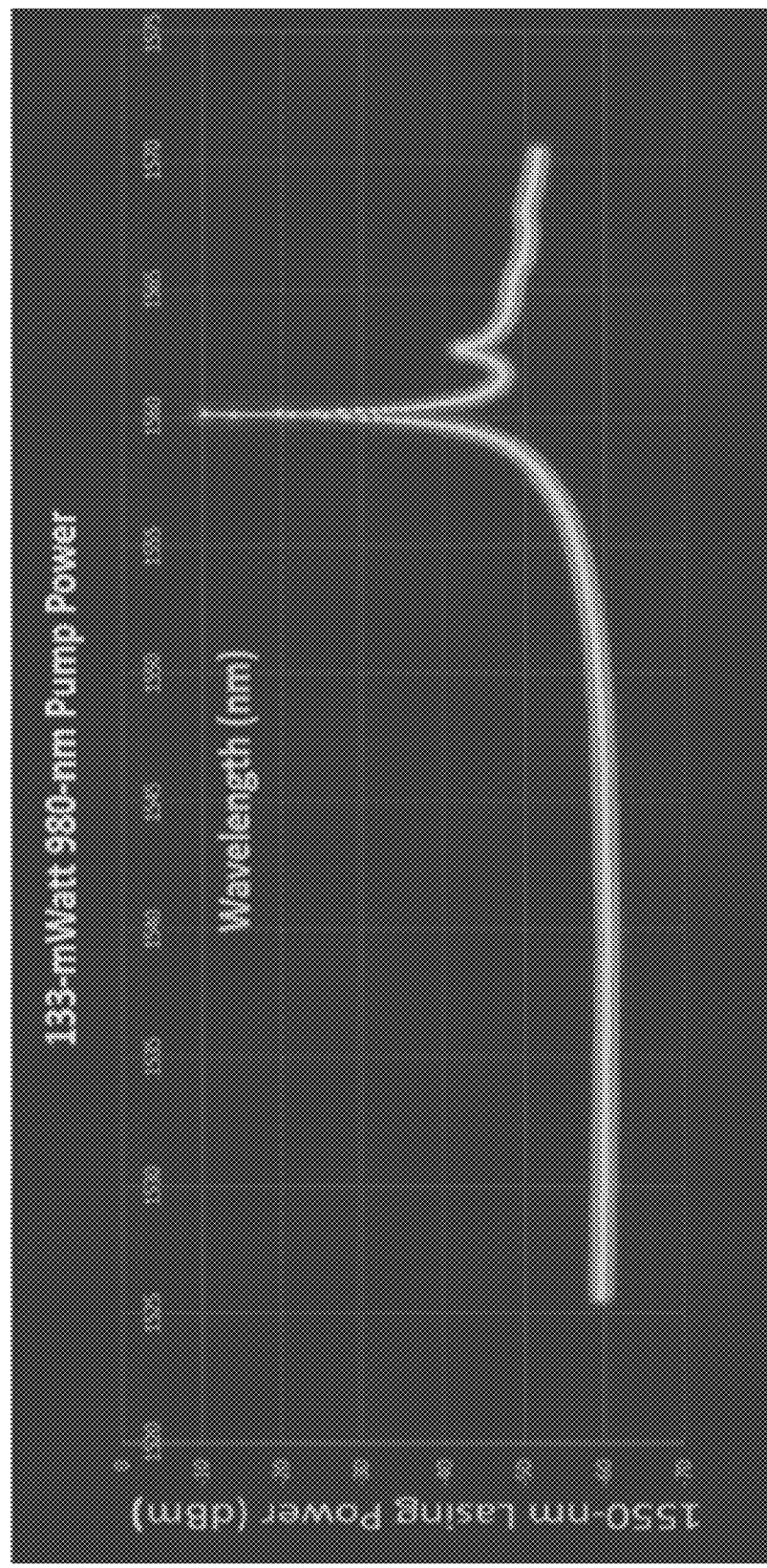
FIG. 6 is a typical lasing spectrum for a DFB laser when it is pumped by a 133 mWatt 980 nm laser.
Figure 7:
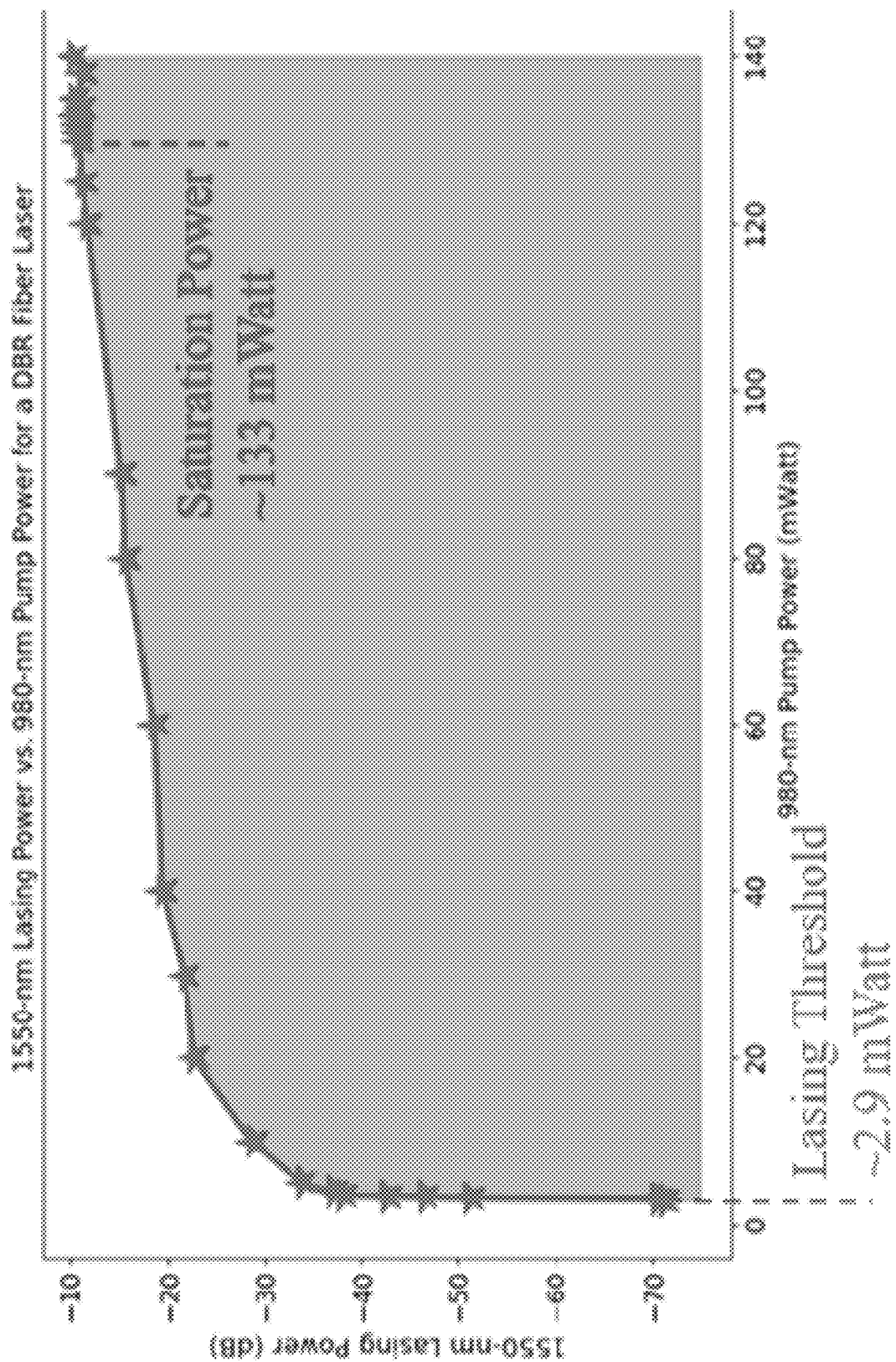
FIG. 7 is a plot of a 1,550 nm lasing powers of the DFB fiber laser for different 980 nm pump powers.

A DFB fiber laser was fabricated according to the design. Laboratory tests were also performed. FIG. 6 shows a typical lasing spectrum when the fiber laser is pumped by a 133 mWatt 980 nm laser. Lasing powers of 1,550 nm were obtained from the DFB fiber laser for different 980 nm pump powers, which is shown in FIG. 7, from which it can be seen that the DFB fiber laser has a threshold 980 nm pump power of about 2.9 mWatt and it saturates at about 133 mWatt.

E. Fabrication of Graphene-Fiber Laser Microphone (FLM)

The graphene diaphragm was prepared from a graphene/nickel/graphene sample in which multilayer graphene film of about 105 nm was grown on a 25-μm thick nickel foil through the Chemical Vapor Deposition (CVD) method. The graphene/nickel/graphene sample was first immersed in an iron chloride aqueous solution to etch away the nickel support. The graphene film was then transferred to a dish and washed with De-Ionized (DI) water multiple times until the water became colorless. The graphene film was further suspended in DI water for another 30 minutes to remove residual iron and nickel ions. It was then transferred to a new dish and floated on the water surface. A 125-μm diameter single-mode fiber tip, pre-inserted into an optical fiber ferrule with an inner diameter of 125 μm, was then moved slowly toward the optical fiber ferrule end face until it is about 0.1-2 mm from the end face. The graphene diaphragm was then attached to the optical fiber ferrule end face via the van der Waals interaction. After air drying at room temperature, the graphene-FLM head is ready to be integrated with the DBR/DFB fiber laser to form the graphene-FLM.

F. Laboratory Tests of Graphene FLM

Figure 8:
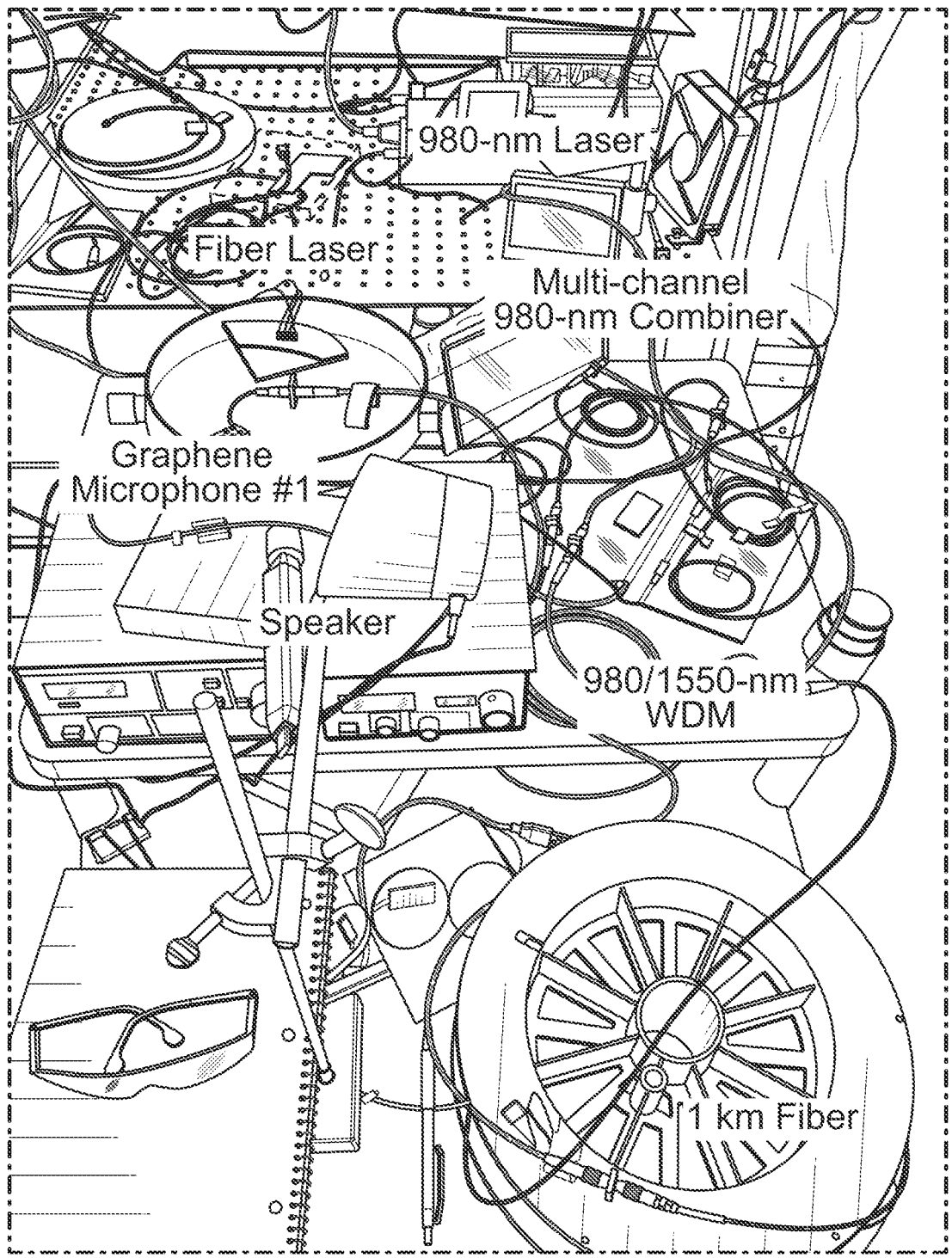
FIG. 8 is an optical image of an acoustic sensing assembly including a fiber laser and a graphene diaphragm based acoustic sensor, according to an embodiment.

Laboratory tests of the fabricated graphene-FLM were performed with various acoustic frequencies up to 10 kHz. FIG. 8 shows the experimental setup for the laboratory test of the graphene-FLM. A 980 nm pump laser is used to excite the DFB fiber laser through the 980 nm input port of a 980/1,550 nm Wavelength Division Multiplexer (WDM), which propagate through and the 980/1,550 nm combination port towards the DFB fiber laser via a 1 km long fiber optic cable. The 1,550 nm output port of the WDM is connected to a 1,550 nm photo-diode detector for 1,550 nm lasing intensity monitoring. The other side of the DFB fiber laser is connected to the graphene-FLM head with a graphene diaphragm. When the acoustic signal vibrates the graphene diaphragm, it phase-modulates the 1,550 nm reflection feedback towards the DFB fiber laser and thus changes the lasing intensity of the 1,550 nm laser. The 1,550 nm photo-diode connected to the 1,550 nm output port of the WDM detects the modulated 1,550 nm laser signal in real time, which corresponds to the time-series acoustic signal.

G. Experimental Results

Figure 9:
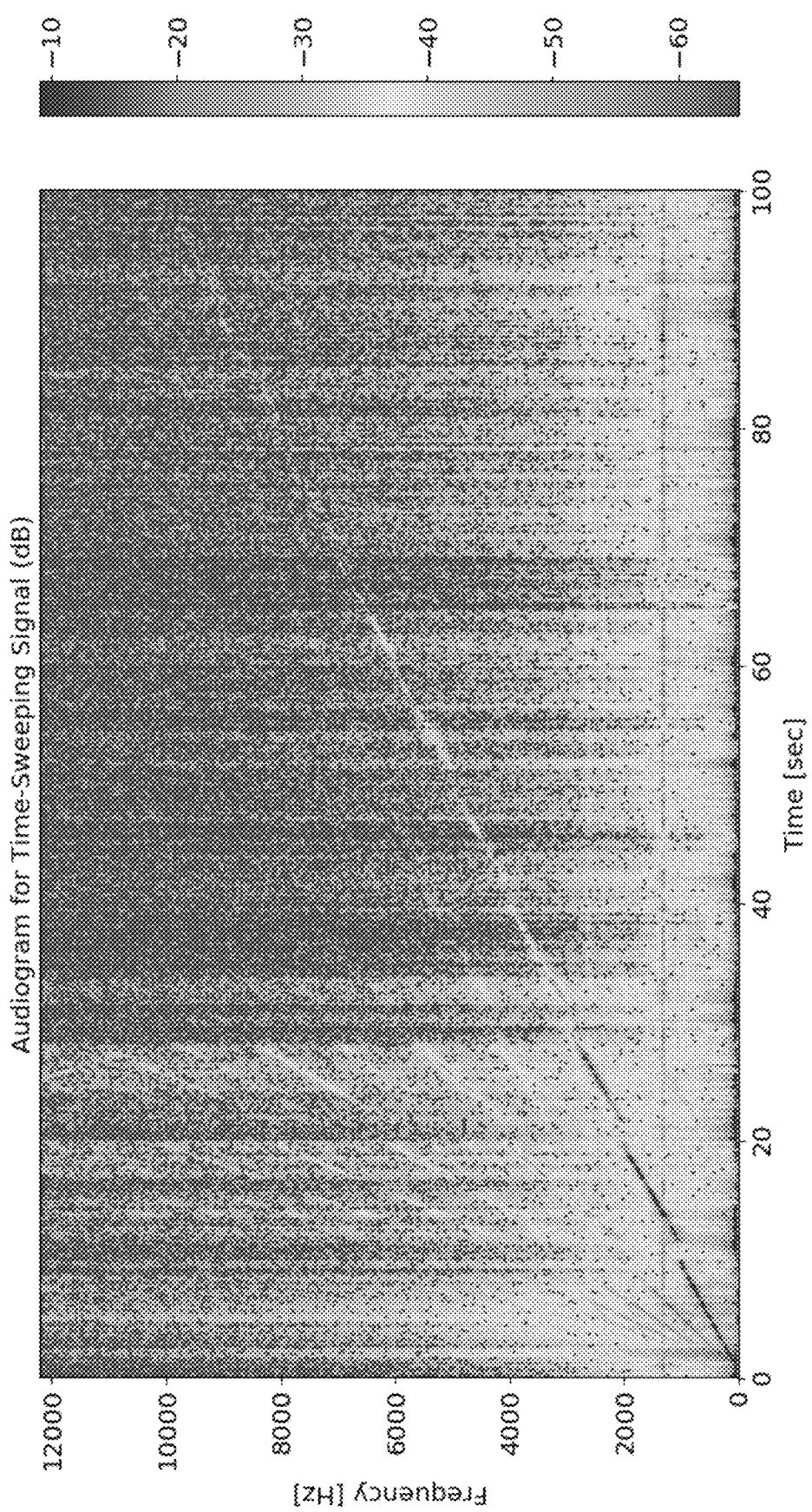
FIG. 9 is a spectrogram of the acoustic sensing assembly of FIG. 8 in response to acoustic signals ranging from 0 Hz to 10 kHz, at a remote distance of 1 km.
Figure 10:
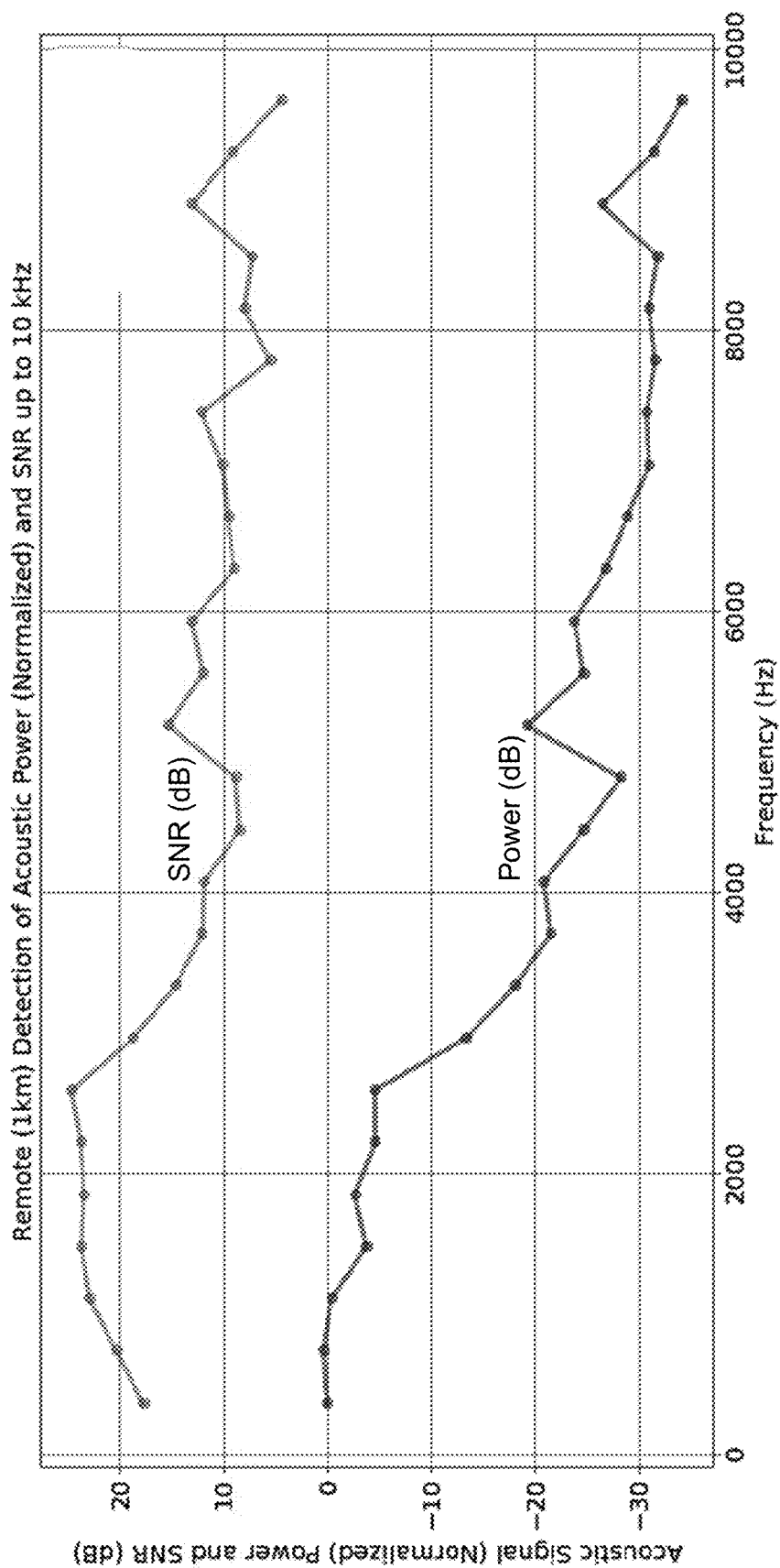
FIG. 10 are plots of acoustic power and signal to noise ratio (SNR) measured by the acoustic sensing assembly of FIG. 8 for acoustic frequencies ranging from 500 Hz to 10 kHz.

FIG. 9 is a spectrogram obtained from the graphene-FLM acoustic sensor for an acoustic frequency sweep from 0 Hz to 10 kHz. FIG. 10 are plots of acoustic power sensed by the graphene-FLM for various acoustic frequencies ranging from 500 Hz to 10 kHz, and the corresponding SNR. The power was greater than −40 dB and the SNR was greater than 5 dB for acoustic frequency of up to 10 kHz.

Figure 11:
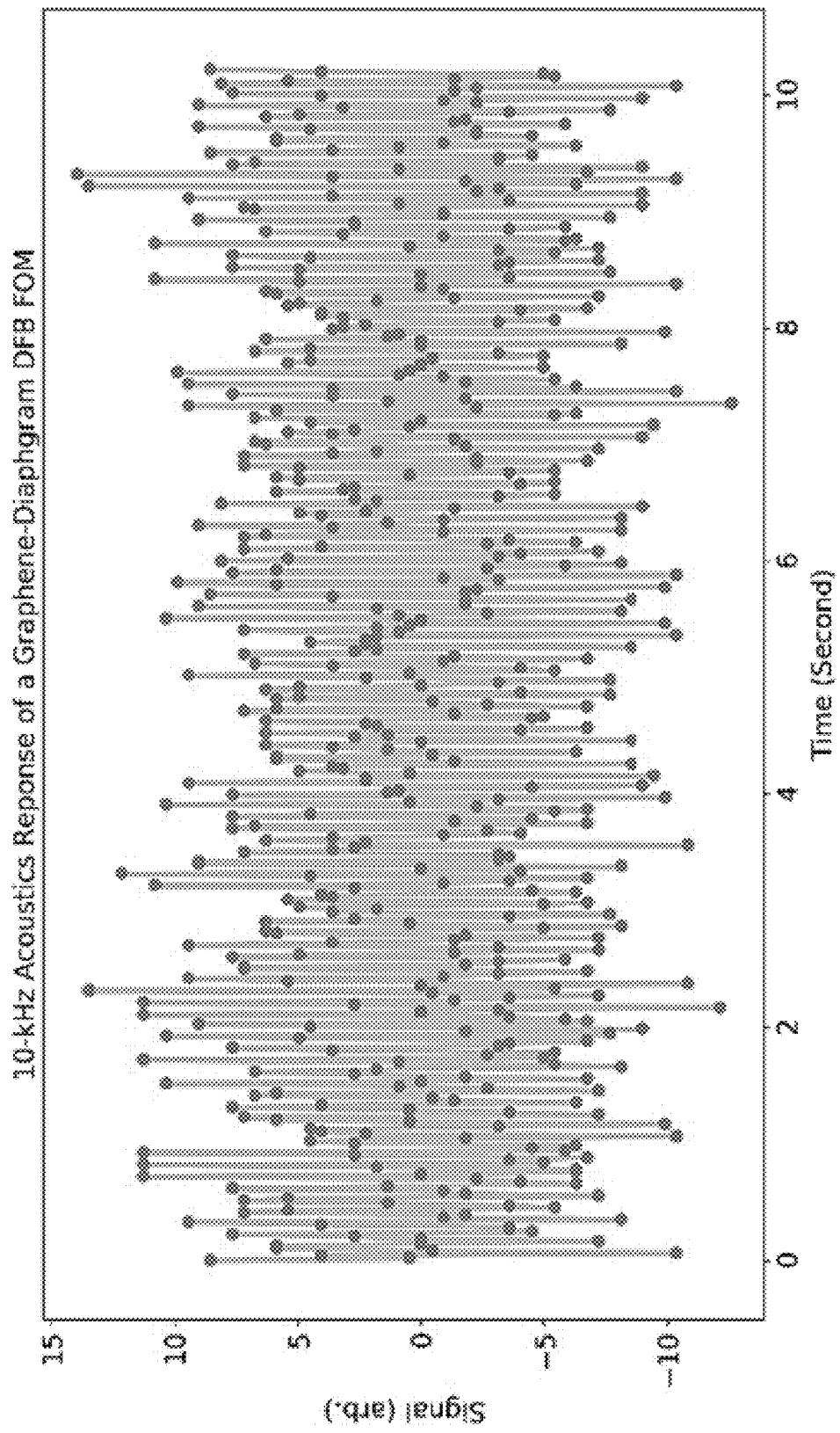
FIG. 11 is a plot of a time series acoustic response of the acoustic sensing assembly of FIG. 8 in response to a 10 kHz acoustic signal.
Figure 12:
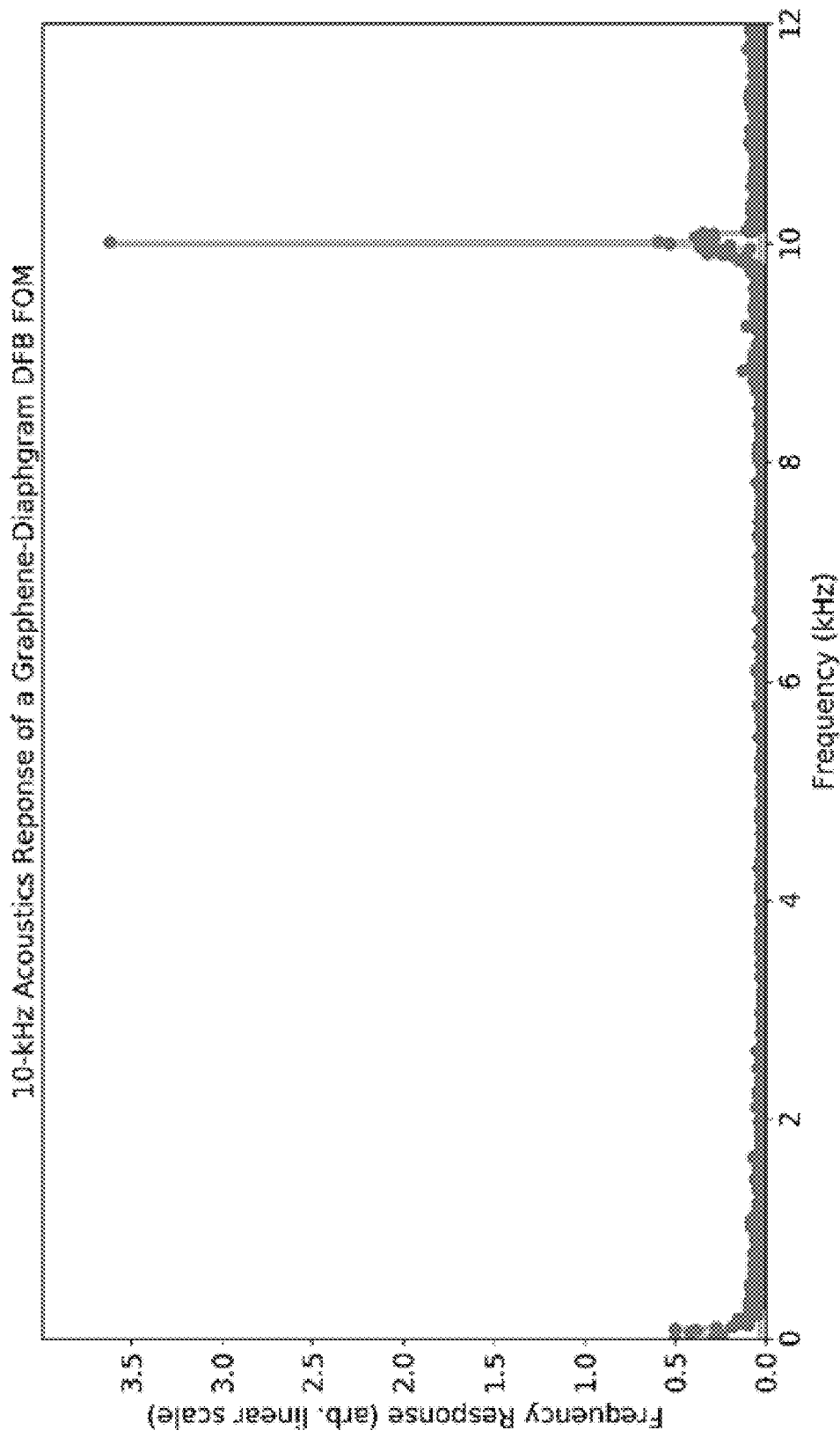
FIG. 12 is a plot showing acoustic response of the acoustic sensing assembly of FIG. 8.

FIGS. 11 and 12 show the 10 kHz acoustic signal response of the graphene-FLM in both time domain (FIG. 11) and frequency domain (FIG. 12). A sharp spectrum peak at 10 kHz in the frequency domain clearly shows that the graphene-FLM can detect acoustic signal up to 10 kHz and potentially beyond based on its estimated SNR (SNR about 12 dB at 10 kHz).

In summary, embodiments described herein describe a miniature, ultrasensitive, and broadband graphene-FLM by integrating a DFB fiber laser of a few cm long and a multilayer graphene membrane. Experimental result demonstrates that the miniature graphene-FLM is very sensitive to the acoustic signal up to 10 kHz and potentially beyond.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" generally mean plus or minus 10% of the stated value. For example, about 0.5 would include 0.45 and 0.55, about 10 would include 9 to 11, about 1000 would include 900 to 1100.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. An acoustic sensor, comprising:
 a sensing head, comprising:
  a ferrule,
  an optical fiber inserted into the ferrule, the optical fiber defining an optical path therethrough, the optical fiber having an optical fiber tip at a longitudinal end of the optical fiber, the optical fiber tip extending beyond an end face of the optical path such that the end face of the optical path is spaced apart from the optical fiber tip by a distance, the optical fiber tip located axially inwards of a longitudinal end of the ferrule, and
  a graphene diaphragm disposed on and contacting the end face of the optical fiber tip axially inwards of the longitudinal end of the ferrule such that a portion of the graphene diaphragm is spaced apart from the end face of the optical path defined by the optical fiber by the distance, an outer peripheral edge of the graphene diaphragm being coupled to the ferrule, the graphene diaphragm configured to vibrate in response to an acoustic signal; and
 a fiber laser optically coupled to the sensing head, the fiber laser comprising a first set of fiber Bragg gratings and a second set of fiber Bragg gratings such that a gap is present between the first set and the second set of fiber Bragg gratings, the fiber laser configured to generate a sensing optical signal having a first intensity in response to an excitation optical signal, the sensing optical signal impinging on the graphene diaphragm such that a feedback optical signal is reflected from the graphene diaphragm towards the fiber laser, the feedback optical signal having a second intensity due to modulation of the sensing optical signal by the vibration of the graphene diaphragm that corresponds to the acoustic signal, the feedback optical signal having sufficient power for being detectable by an intensity detector after travelling through a fiber optic communication cable having a length in a range of 1 km to 10 km.

2. The acoustic sensor of claim 1, wherein at least a portion of the graphene diaphragm is spaced apart from the optical fiber tip by a distance.

3. The acoustic sensor of claim 1, wherein the sensing optical signal has a wavelength in a range from 1,530 to 1,565 nm.

4. The acoustic sensor of claim 1, wherein the excitation optical signal has a wavelength of about 980 nm.

5. The acoustic sensor of claim 1, wherein the fiber laser comprises a Distributed Bragg Reflector (DBR) fiber laser, and wherein the gap between the first set and the second set of fiber Bragg gratings is in a range of 1 mm to 10 mm.

6. The acoustic sensor of claim 5, wherein a spacing between each grating of the first set of fiber Bragg gratings and the second set of fiber Bragg gratings is about 530 nm.

7. The acoustic sensor of claim 1, wherein the fiber laser comprises a Distributed Feedback Bragg (DFB) laser, and wherein the gap between the first set and the second set of fiber Bragg gratings is about 265 nm.

8. The acoustic sensor of claim 7, wherein a spacing between each grating of the first set of fiber Bragg gratings and the second set of fiber Bragg gratings is about 530 nm.

9. An acoustic sensing assembly, comprising:
a sensing head, comprising:
a ferrule;
an optical fiber inserted into the ferrule, the optical fiber defining an optical path therethrough, the optical fiber having an optical fiber tip, the optical fiber tip extending beyond an end face of the optical path such that the optical path is spaced apart from the optical fiber tip by a distance, the optical fiber tip located axially inwards of a longitudinal end of the ferrule, and
a graphene diaphragm disposed on and contacting the end face of the optical fiber tip axially inwards of the longitudinal end of the ferrule such that a portion of the graphene diaphragm is spaced apart from the end face of the optical path defined by the optical fiber by the distance, an outer peripheral edge of the graphene diaphragm being coupled to the ferrule, the graphene diaphragm configured to vibrate in response to an acoustic signal;
a fiber laser optically coupled at a first end thereof to the sensing head and comprising a first set of fiber Bragg gratings and a second set of fiber Bragg gratings such that a gap is present between the first set and the second set of fiber Bragg gratings, the fiber laser configured to generate a sensing optical signal having a first intensity in response to an excitation optical signal, the sensing optical signal impinging on the graphene diaphragm such that a feedback optical signal is reflected from the graphene diaphragm towards the fiber laser, the feedback optical signal having a second intensity due to modulation of the sensing optical signal by the vibration of the graphene diaphragm that corresponds to the acoustic signal;
a fiber optic communication cable having a length in a range of 1 km to 10 km coupled to a second end of the fiber laser opposite the first end;
a signal generator configured to generate the excitation optical signal; and
an intensity detector configured to detect the response optical signal and determine the acoustic signal therefrom,
wherein the feedback optical signal has sufficient power for being detectable the intensity detector after travelling through the fiber optic communication cable.

10. The acoustic sensing assembly of claim 9, wherein the sensing optical signal has a wavelength in a range of 1,530 nm to 1,565 nm.

11. The acoustic sensing assembly of claim 9, wherein the excitation optical signal has wavelength of about 980 nm.

12. The acoustic sensing assembly of claim 9, wherein the fiber laser comprises a Distributed Bragg Reflector (DBR) laser, and wherein the gap between the first set and the second set of fiber Bragg gratings is in a range of 1 mm to 10 mm.

13. The acoustic sensing assembly of claim 12, wherein a spacing between each grating of the first set of fiber Bragg gratings and the second set of fiber Bragg gratings is about 530 nm.

14. The acoustic sensing assembly of claim 9, wherein the fiber laser comprises a Distributed Feedback Bragg (DFB) laser, and wherein the gap between the first set and the second set of fiber Bragg gratings is about 265 nm.

15. The acoustic sensing of claim 14, wherein a spacing between each grating of the first set of fiber Bragg gratings and the second set of fiber Bragg gratings is about 530 nm.

16. The acoustic sensing assembly of claim 9, further comprising a wavelength-division multiplexer coupled to each of the signal generator and the intensity detector.

17. A method, comprising:
transmitting an excitation optical signal to a fiber laser of an acoustic sensor, the acoustic sensor comprising:
a sensing head, comprising:
a ferrule;
an optical fiber inserted into the ferrule, the optical fiber defining an optical path therethrough, the optical fiber having an optical fiber tip, the optical fiber tip extending beyond an end face of the optical path such that the end face of the optical path is spaced apart from the optical fiber tip by a distance, the optical fiber tip located axially inwards of a longitudinal end of the ferrule, and
a graphene diaphragm disposed on the optical fiber tip axially inwards of the longitudinal end of the ferrule such that a portion of the graphene diaphragm is spaced apart from the end face of the optical path by the distance, an outer peripheral edge of the graphene diaphragm being coupled to the ferrule, the graphene diaphragm configured to vibrate in response to an acoustic signal; and
a fiber laser optically coupled to the sensing head and comprising a first set of fiber Bragg gratings and a second set of fiber Bragg gratings having a gap therebetween, the fiber laser configured to generate a sensing optical signal having a first intensity in response to the excitation optical signal;
detecting a feedback optical signal reflected from the graphene diaphragm, the feedback optical signal having a second intensity due to modulation of the sensing optical signal by the vibration of the graphene diaphragm that corresponds to the acoustic signal, the feedback optical signal having sufficient power for being detectable by an intensity detector after travelling through a fiber optic communication cable having a length in a range of 1 km to 10 km;
determining optical parameters of the feedback optical signal; and
determining acoustic parameters of the acoustic signal from the optical parameters.

18. The method of claim 17, wherein the fiber laser comprises a Distributed Bragg Reflector (DBR) laser, and wherein the gap between the first set and the second set of fiber Bragg gratings is in a range of 1 mm to 10 mm.

19. The method of claim 17, wherein the fiber laser comprises a Distributed Feedback Bragg (DFB) laser, and wherein the gap between the first set and the second set of fiber Bragg gratings is about 265 nm.

* * * * *